(12) United States Patent
Zanzig

(10) Patent No.: US 6,838,511 B2
(45) Date of Patent: *Jan. 4, 2005

(54) TIRE WITH CONFIGURED RUBBER SIDEWALL DESIGNED TO BE GROUND-CONTACTING REINFORCED WITH CARBON BLACK, STARCH AND SILICA

(75) Inventor: David John Zanzig, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 525 days.

This patent is subject to a terminal disclaimer.

(21) Appl. No.: 09/975,167

(22) Filed: Oct. 11, 2001

(65) Prior Publication Data

US 2003/0073774 A1 Apr. 17, 2003

(51) Int. Cl.⁷ .................................................. C08K 3/34
(52) U.S. Cl. ........................ 524/492; 524/493; 524/495; 524/496; 524/47; 152/209.11; 152/209.12
(58) Field of Search .................................. 524/492, 493, 524/495, 496, 47; 152/209.11, 209.12, 525

(56) References Cited

U.S. PATENT DOCUMENTS

| | | | |
|---|---|---|---|
| 4,900,361 A | 2/1990 | Sachetto et al. | 106/213 |
| 5,258,430 A | 11/1993 | Bastioli et al. | 524/52 |
| 5,374,671 A | 12/1994 | Corvasce et al. | 504/47 |
| 5,403,923 A | 4/1995 | Kashimura et al. | 536/7.4 |
| 5,672,639 A | 9/1997 | Corvasce et al. | 524/52 |
| 2001/0020505 A1 | 9/2001 | Zanzig et al. | 152/209.12 |

FOREIGN PATENT DOCUMENTS

WO        0149785        7/2001        ........... C08L/21/00

OTHER PUBLICATIONS

European Search Report.

Primary Examiner—Edward J. Cain
(74) Attorney, Agent, or Firm—Henry C. Young, Jr.

(57) ABSTRACT

This invention relates to a pneumatic rubber tire having a circumferential rubber tread of a lug and groove configuration which extends to a substantial portion an adjacent rubber sidewall and is designed to be ground-contacting. Said lug and groove configured portion of said sidewall is of a rubber composition comprised of a blend of cis 1,4-polyisoprene natural rubber and cis 1,4-polybutadiene rubber which contains reinforcement as carbon black, starch/plasticizer composite and aggregates of participated silica together with a coupling agent. Said circumferential rubber tread is of a rubber composition comprised of at least one diene-based rubber together with carbon black reinforcement and is exclusive of starch and precipitated silica.

20 Claims, 2 Drawing Sheets

Figure 1:
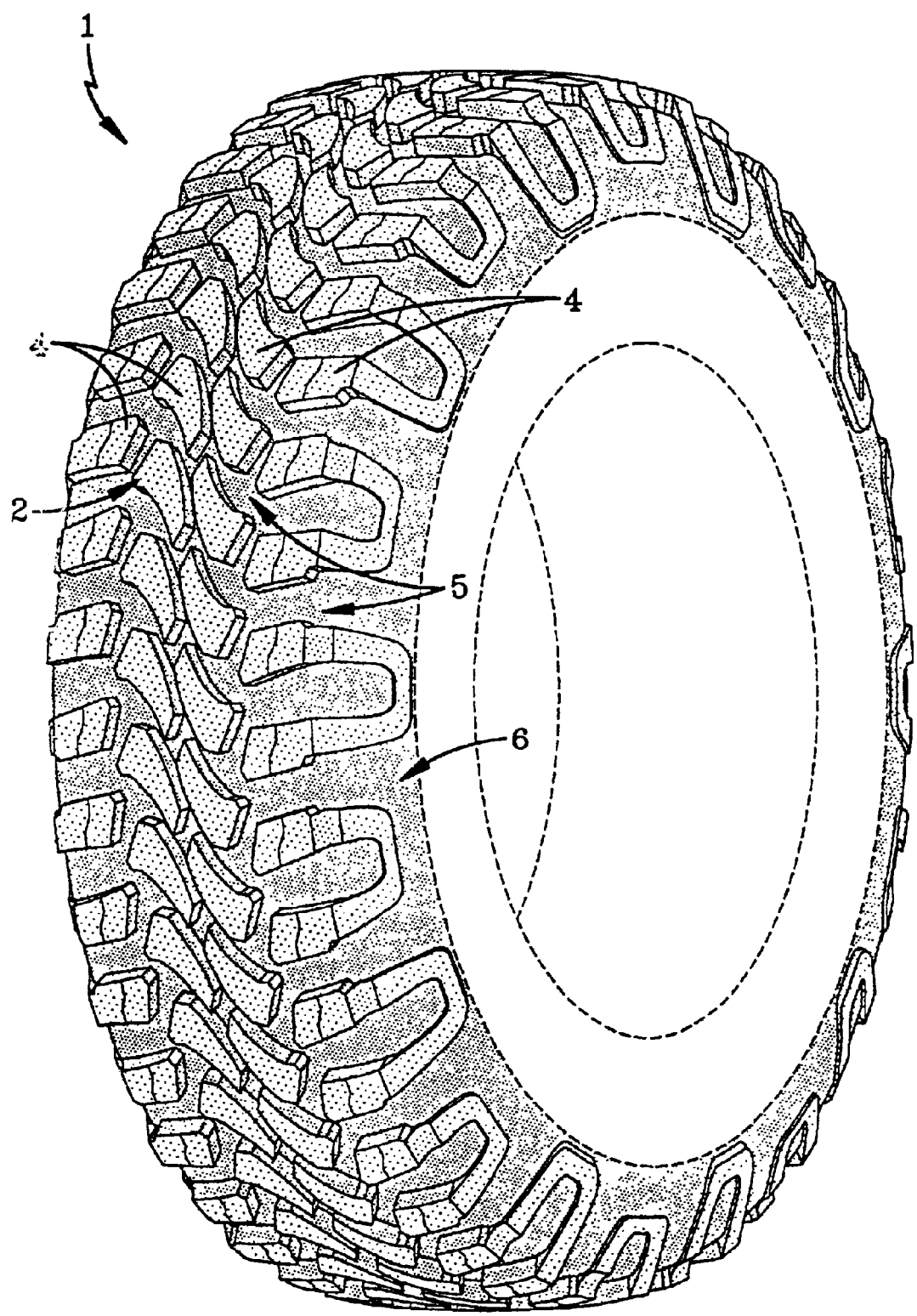

TIRE WITH CONFIGURED RUBBER SIDEWALL DESIGNED TO BE GROUND-CONTACTING REINFORCED WITH CARBON BLACK, STARCH AND SILICA

FIELD OF THE INVENTION

This invention relates to a pneumatic rubber tire having a circumferential rubber tread of a lug and groove configuration which extends to a substantial portion an adjacent rubber sidewall and is designed to be ground-contacting. Said lug and groove configured portion of said sidewall is of a rubber composition comprised of a blend of cis 1,4-polyisoprene natural rubber and cis 1,4-polybutadiene rubber which contains reinforcement as carbon black, starch/plasticizer composite and aggregates of participated silica together with a coupling agent. Said circumferential rubber tread is of a rubber composition comprised of at least one diene-based rubber together with carbon black reinforcement and is exclusive of starch and precipitated silica.

BACKGROUND OF THE INVENTION

Pneumatic rubber tires are conventionally composed of a toroidal carcass with a circumferential tread and adjoining sidewalls.

The tread is conventionally designed to be ground-contacting and thereby is of a suitable rubber composition for such purpose and also is of a suitable configuration. For example, such a tread may have properties which emphasize good traction and resistance to treadwear. Such tires may have a tread of a lug and grove configuration which is designed to be ground-contacting.

In contrast, the associated sidewalls are conventionally not designed to be ground contacting and, in order to be appropriately supportive of the tread, are conventionally composed of a rubber composition which is not designed for traction and resistance to treadwear but, instead, of a rubber composition which is of low hysteresis to provide low heat buildup and is softer to provide greater flexibility than that of the tread rubber.

As a result, such softer sidewall rubber compositions typically have less resistance to puncturing objects, abrasion and to scuffing against road curbs or other objects.

However, some tires are desired to be utilized under more harsh conditions such as, for example, rough roads or off-the-road service or on specialty vehicles which may be designed to run on low inflation tires where the tire sidewall may come in contact with the ground. Such circumstances may occur, for example, in various mine operations and in logging operations, or where the tire is run over rough terrain at low inflation pressures. Under such conditions, growth of a crack, or cut, in the sidewall and, also, resistance to puncture, are significant considerations.

A significant need for a sidewall rubber composition for such use is a hybrid rubber composition which with suitable resistance to puncture and abrasion typically associated with tread rubber compositions while substantially maintaining flex fatigue and hysteretic properties typically associated with sidewall rubber compositions.

It is appreciated that commercially available tires may sometimes have sidewalls designed to be resistant to cut growth which are comprised of carbon black reinforced elastomer compositions comprised of natural rubber and cis 1,4-polybutadiene rubber.

It is also appreciated that carbon blacks for reinforcement of tire sidewall rubber compositions are conventionally of appreciably larger particle size than carbon blacks usually used for tire treads since resistance to heat buildup rather than abrasion resistance is typically more important for tire sidewalls.

Such carbon black might be exemplified, for example, by having an Iodine value (number) (ASTM D1510) in a range of about 35 to about 85 g/kg instead of a higher iodine value of at least about 105 which would be more representative of a carbon black typically used for a tread rubber composition.

Here, however, it is desired to provide a novel tire with rubber sidewall of a lug and groove configuration an of a composition comprised of natural rubber and cis 1,4-polybutadiene of which a significant portion is designed to be occasionally ground contacting and thereby having a resistance to puncture as well as resistance to abrasion more typical of tire tread rubber compositions yet substantially retaining flexibility and low hysteresis usually required for a tire sidewall.

It may be readily thought of to increase the natural rubber content of the sidewall composition in order to increase resistance to tear. However the cis 1,4-polybutadiene content would be correspondingly reduced which would be expected to thereby undesirably reduce its resistance to abrasion and undesirably increase its hysteresis (as would be expected to be evidenced by a reduction in its rebound property).

Accordingly, it is desired herein to provide such a tire sidewall of a rubber composition which contains large particle size carbon black reinforcement common for sidewall compositions and which is composed of natural rubber and cis 1,4-polybutadiene elastomers, also somewhat common to many sidewall compositions but, however, which has enhanced resistance to abrasion and puncturing objects and, also enhanced resistance to tear more common to tire tread rubber compositions.

For the purposes of this invention, rubber reinforcement for said lug and groove configured sidewall is composed of a combination of said carbon black as well as a starch/plasticizer composite, aggregates of precipitated silica and coupling agent.

In the description of this invention, the term "phr" relates to parts by weight of an ingredient per 100 parts by weight of rubber.

The terms "rubber" and "elastomer are used interchangeably.

The term "Tg" relates to a glass transition temperature of an elastomer, normally determined by a differential scanning (DSC) calorimeter with a temperature rise of 10° C. per minute. (ASTM D3418)

DISCLOSURE AND PRACTICE OF THE INVENTION

In accordance with this invention, a pneumatic rubber tire is provided with a carcass with circumferential rubber tread and associated sidewalls, wherein said tread and a portion of said sidewalls adjacent to said tread are of a lug and groove configuration designed to be ground-contacting, wherein said lug and groove configuration extends from said tread over at least thirty, alternatively at least fifty, percent of the tire sidewall adjacent to said tread, and alternately at least to a maximum section width of the tire, and wherein (A) said lug and groove configured portion of said sidewall is of a rubber composition which comprises, based on 100 parts by weight rubber (phr),
 (1) elastomers comprised of
  (a) about 40 to about 80, alternately about 45 to about 70, phr of cis 1,4-polyisoprene natural rubber having a Tg in a range of about −65° C. to about −75° C., and (b) about 20 to about 60, alternately about 30 to about 55, phr of cis 1,4-polybutadiene rubber having a Tg in a range of about 100° C. to about 106° C.

(2) about 40 to about 80 phr of reinforcing filler comprised of, and (a) about 5 to about 40 phr of carbon black having an Iodine value (ASTM D1510) of about 35 to about 85 g/kg and a dibutylphthalate (DBP) value (ASTM D2414) of about 70 to about 130 cm$^3$/100 g, wherein said carbon black is exclusive of carbon blacks having an Iodine value of 106 g/kg or greater;

(b) about 10 to about 70 phr of aggregates of precipitated silica, wherein the weight ratio of silica to carbon black is in a range of about 0.3/1 to about 3/1, alternately about 0.8/1 to about 1.5/1, and (c) about one to about 12 phr of starch/plasticizer composite which contains hydroxyl groups thereon comprised of a composite of starch and a plasticizer for said starch to reduce its softening point by at least about 10° C. from a range of about 180° C. to about 220° C. to a range of about 110° C. to about 170° C., and (3) a coupling agent having a moiety reactive with hydroxyl (e.g. silanol groups) on the surface of said aggregates of precipitated silica and on the surface of said starch/plasticizer composite and another moiety interactive with said elastomer(s), and (B) said tread rubber of said circumferential tread, other than said rubber composition of said lug and groove configured sidewall, is comprised of, based on parts per 100 parts of rubber:

(1) at least one diene-based elastomer selected from polymers of isoprene and/or 1,3-butadiene and copolymers of styrene with isoprene and/or 1,3-butadiene, (2) about 30 to about 95, alternately about 40 to about 75, phr of carbon black having an Iodine value in a range of about 100 to about 145 g/kg and a DPB value in a range of about 100 to about 145 cm$^3$/100 g, wherein said tread rubber composition is exclusive of precipitated silica, starch/plasticizer composite and coupling agent for said silica and starch/plasticizer composite and is exclusive of carbon black having an Iodine value in a range of from 35 to 85 g/kg together with a DBP value in a range of 70 to 130 cm$^3$/100 kg.

In particular, use of silica and coupling agent in the sidewall rubber composition is designed to enhance resistance to tear, puncturing and abrasion while substantially maintaining hysteresis, or rebound physical property, of the sidewall rubber composition.

In particular the use of said starch/plasticizer composite is designed to enhance the modulus, hysteresis of the cured rubber composition and the processability of the rubber composition in its uncured state as well as to reduce the weight of the rubber composition. Use of the cis 1,4-polyisoprene natural rubber in the configured sidewall is designed to improve the durability of the cured rubber composition and the processability of the rubber composition in its uncured state. Use of the cis 1,4-polybutadiene rubber in the configured sidewall rubber composition is designed to enhance its resistance to abrasion and to promote or maintain a relatively low hysteresis (relatively high rebound property).

In one aspect of the invention, a relative immiscibility of the cis 1,4-polybutadiene rubber phase in the natural rubber phase is relied upon to contribute a resistance to cut/crack growth propagation for the sidewall composition. The relative immiscibility is primarily a result of a wide disparity of the glass transition temperatures (Tg's), namely differing by at least 30° C., of the cis 1,4-polybutadiene rubber (e.g.: about −100° C. to about −106° C.) and the natural rubber (e.g.: about −65° C. to about −70° C.). Such immiscibility phenomenon due to disparity of Tg's of various elastomers is well known to those skilled in such art.

In order to enhance such disparity of Tg's for the elastomers of the sidewall rubber composition, it is preferred that the sidewall rubber composition is exclusive of elastomer(s) with Tg's intermediate (between) the aforesaid Tg's of said natural rubber and cis 1,4-polybutadiene rubber, namely exclusive of elastomers having a Tg in a range of about −70° C. and about −100° C.

Accordingly, in order to provide such a sidewall rubber composition for the sidewall lug and groove configuration designed to be ground contacting which is therefore both resistant to tear and also resistant to abrasion, the blend of natural rubber and cis 1,4-polybutadiene rubber blend, with their aforesaid spaced apart Tg's is reinforced with a combination of relatively large size carbon black and particulate silica together with a coupling agent together with a starch/plasticizer composite.

In particular, the larger size carbon black is a carbon black conventionally used for rubber sidewalls and is in contrast to relatively small size carbon blacks conventionally used for tire tread rubber compositions. It is considered herein that a contribution of such relatively large size carbon black is to promote cut growth resistance to the sidewall rubber composition.

Therefore, as the lug and groove configuration extends from the tread to the configured portion of the sidewall, the included carbon black reinforcement characterization is required to change.

Aggregates of precipitated silica is required by this invention to be used in combination with the larger size carbon black as reinforcement for the natural rubber/cis 1,4-polybutadiene for the rubber composition of the lug and groove portion of the tire sidewall. It is considered herein that a significant contribution of the silica, when used with a coupling agent, is to enhance modulus (e.g.: 300% modulus), puncture resistance, abrasion resistance, tear resistance while substantially maintaining a relatively low hysteresis for the rubber composition.

Therefore, a significant aspect for the configured portion of the rubber sidewall of this invention configured with a lug and groove design for ground contacting purposes is the unique combination of specified amounts of natural rubber and cis 1,4-polybutadiene rubber with spatially defined Tg's differing by at least 30° C. and with a specified reinforcement system of selected relatively large particle size carbon black and silica with coupling agent, together with starch/plasticizer composite, to achieve such rubber composition with acceptable resistance to abrasion and resistance to puncture while substantially maintaining low hysteresis (rebound physical property) and flex properties.

The natural rubber for use in this invention is a cis 1,4-polyisoprene rubber typically having a cis 1,4-content in a range of about 95 to about 100 percent and a Tg in a range of about −65° C. to about −70° C.

The cis 1,4-polybutadiene for use in this invention preferably has a cis 1,4-content in a range of about 95 to about 99 percent and a Tg in a range of about −100° C. to about −106° C.

As hereinbefore discussed, it is of a particular importance for this invention that the cis 1,4-polysioprene rubber and cis 1,4-polybutadiene rubber for use in this invention have spaced apart Tg's, namely Tg's that differ by at least 30° C.

in order that the rubbers are relatively incompatible, or immiscible, with each other in order, for example, to promote resistance to cut growth.

As hereinbefore discussed, the relatively large size carbon black for use in the configured sidewall for this invention is evidenced by having an Iodine number in a range of about 35 to about 85 g/kg and a DBP value in range of about 70 to about 130 cm$^3$/100 g.

Representative examples of such large carbon blacks are, for example, of ASTM designations: N550, N660 and N326. Representative examples of carbon blacks for said circumferential tread rubber composition are, for example, smaller particle sized N110, N121 and N299 carbon blacks.

Accordingly, it is desired for the carbon black reinforcement filler for the configured sidewall rubber composition to be exclusive of carbon blacks having an Iodine value of 105 g/kg or greater.

The silica for use in this invention is preferably a precipitated silica which may be prepared by acidic precipitation of a silicate, or co-precipitation of a silicate and aluminate and, in general, are well known to those having skill in such art. Typically, such silicas have a BET surface area in a range of from about 125 to about 200 m$^2$/g.

Representative examples of such silicas are, for example Hi-Sil 210, Hi-Sil 243 by PPG Industries, Zeosil 1165MP or Zeosil 165GR by Rhodia Inc., VN3, Ultrasil 3370 and Ultrasil 7005 and by Degussa and Zeopol 8745 and Zeopol 8715 by Huber.

Starch/plasticizer composites have been suggested for use in elastomer compositions for various purposes, including tires. For example, see U.S. Pat. No. 5,672,639. In U.S. Pat. No. 6,273,163, a first and second coupling agent are sequentially mixed with the rubber composition, thereby substantially decoupling the action of the first coupling agent from the action of the second coupling agent. Various other U.S. patents, for example, U.S. Pat. Nos. 5,403,923; 5,374,671; 5,258,430 and 4,900,361 disclose preparation and use of various starch materials. As pointed in the aforesaid U.S. Pat. No. 5,672,639, starch may represented, for example, as a carbohydrate polymer having repeating units of amylose (anydroglucopyranose units joined by glucosidic bonds) and amylopetin, a branched chain structure, as is well known to those having skill in such art. Typically, starch may be composed of about 25 percent amylose and about 75 percent amylopectin. *The Condensed Chemical Dictionary*, Ninth Edition (1977)), revised by G. G. Hawley, published by Van Nostrand Reinhold Company, Page 813). Starch can be, reportedly, a reserve polysaccharide in plants such as, for example, corn, potatoes, rice and wheat as typical commercial sources.

Preferably said starch is comprised of amylose units and amylopectin units in a ratio of about 15/85 to about 35/65 and has a softening point according to ASTM No. D1228 in a range of about 180° C. to about 220° C. and where said starch/plasticizer composite has a softening point, reduced from said starch alone, in a range of about 110° C. to about 170° C. according to ASTM No. D1228 which is considered herein to be necessary or desirable to provide the starch/plasticizer composite softening point to approach of to be within the temperature region used for the mixing of the rubber composition itself.

As hereinbefore point out, the starch itself is typically composed of, for example, amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer composite has a softening point in a range of about 110° C. to about 170° C. according to ASTM No. D1228.

For the starch/plasticizer composite, in general, starch to plasticizer weight ratio is in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained, for example, through use of a polymeric plasticizer such as, for example, poly (ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can conventionally be obtained in powder and in pellet forms at different molecular weights and crystallinities such as, for example, a molecular weight of about 11,700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled *A Polymer Composition Including Destructured Starch and Ethylene Copolymer*, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s).

For the practice of this invention, relatively large concentrations (e.g.: about 3 to about 6 phr) of antidegradants are used in the sidewall rubber composition in order to promote ozone and oxidation protection.

In the practice of this invention, while the sidewall rubber composition is designed to be comprised of a combination of natural rubber and cis 1,4-polybutadiene rubber, up to about 15 phr of additional elastomers may be included in the composition, namely elastomers selected from isoprene/butadiene copolymer rubbers, synthetic cis 1,4-polyisoprene rubber and emulsion polymerization prepared styrene/butadiene copolymer rubber)E-SBR) although it is preferably comprised essentially of the aforesaid natural rubber and cis 1,4-polybutadiene rubber.

In general, and in one aspect, it is desired that the sidewall rubber composition, in order to have sufficient flexibility, is exclusive of trans 1,4-polybutadiene, 3,4-polyisoprene, and high vinyl polybutadiene elastomers (polybutadiene rubber with greater than 50 percent vinyl content).

In the practice of this invention, various coupling agents may be used representative of which, for example are bis-(3-trialkoxysilylalkyl) polysulfides which contain from 2 to 8 sulfur atoms in its polysulfidic bridge, with an average of about 3.5 to about 4.5 sulfur atoms for a polysulfide material and an average of about 2 to about 2.6 for a disulfide material. Such alkyl groups for the alkoxy groups are preferably selected from methyl and ethyl, preferably ethyl, groups and the alkyl group for said silylalkyl moiety is selected from ethyl, propyl and butyl radicals.

Preferably, such coupling agent is a bis(3-triethoxysilylpropyl) polysulfide material.

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 10 phr, if used. Such processing aids can include, for example, aromatic, naphthenic, and/or paraffinic processing oils. Representative silicas may be, for example, hydrated amorphous silicas. Typical amounts of antioxidants comprise about 1 about 3 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants for the sidewall composition may comprise about 3 to about 6 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The presence and relative amounts of the above additives are considered to be not an aspect of the present invention which is more primarily directed to the utilization of specified blend of natural rubber and cis 1,4-polybutadiene rubber in tire sidewalls with outer surface of lug and groove configuration designed to be ground contacting as a sulfur vulcanizable composition which reinforced with a specified combination of relatively large particle sized carbon black together with precipitated silica and coupling agent.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators, including primary and optionally secondary accelerators, are used to control the time and/or temperature required for vulcanization and to improve the properties of the vulcanizate. Often accelerators are used in an amount ranging from about 0.5 to about 2.0 phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not necessarily considered to be an aspect of this invention.

Sometimes a combination of antioxidants, antiozonants and waxes may be collectively referred to as "antidegradants".

The tire can be built, shaped, molded and cured by various methods which will be readily apparent to those having skill in such art.

The prepared tire of this invention is conventionally shaped and cured by methods known to those having skill in such art.

Figure 2:
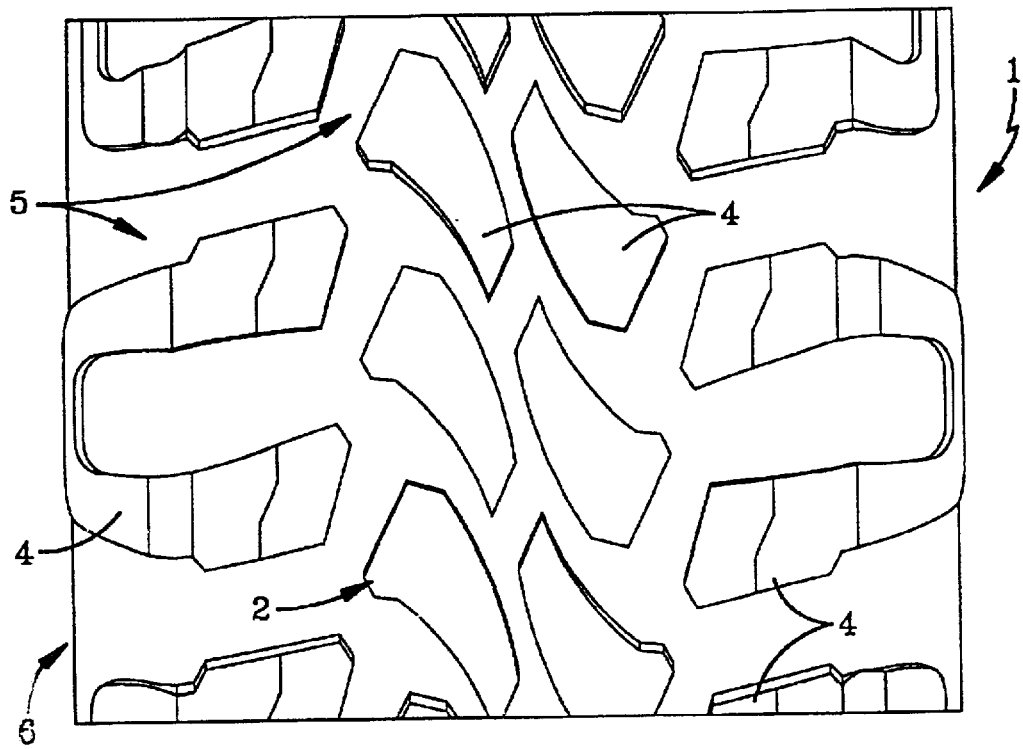
Figure 3:
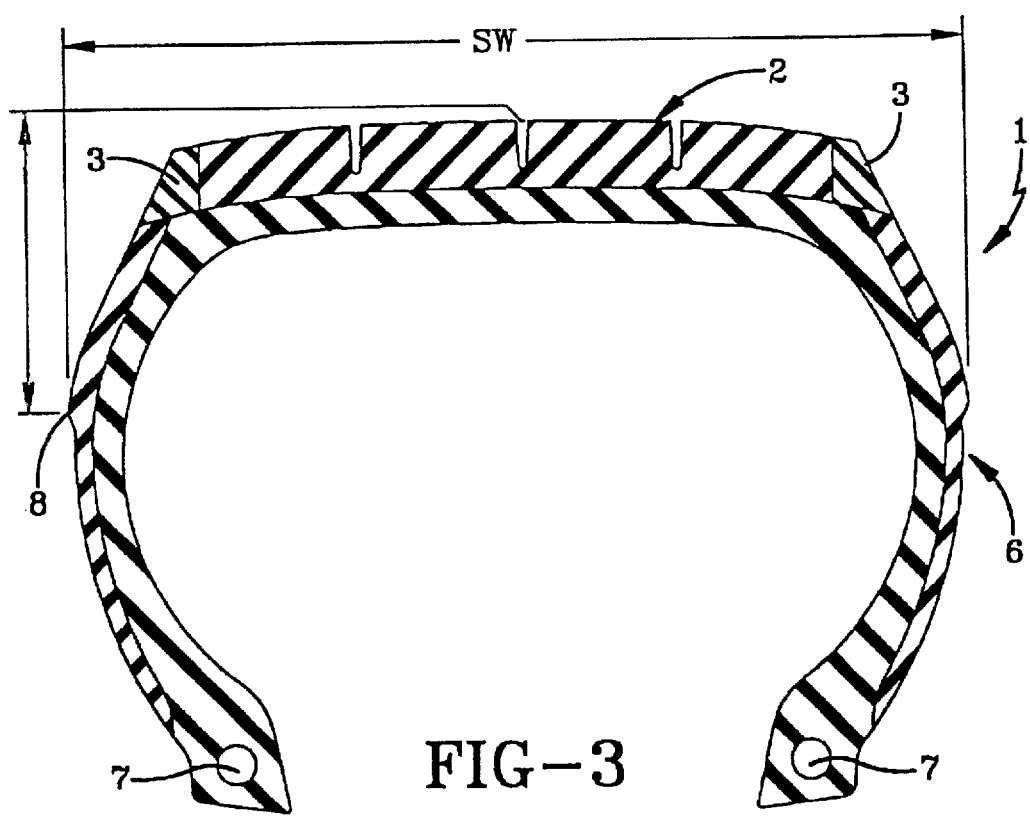

For a further understanding of this invention, reference is made to the accompanying drawings in which FIG. 1 is a perspective view of a tire, FIG. 2 depicts a sectional view of a tire tread and a portion of its sidewalls and FIG. 3 is a tire cross-section.

In particular, in the drawings is seen a tire 1 having a carcass with circumferential rubber tread 2, with tread miniwings 3, having a lug 4 and groove 5 configuration and connecting sidewalls 6.

Uniquely, a portion of the tread 2 with its lug 4 and groove 5 configuration extends to a maximum section width (SW) at position 8 on the sidewall 6 portion adjacent to the tread 2 which is greater than 30 percent, and approximates about 50 percent, of the sidewall 6 surface.

In particular, the configured outer surface of the sidewall 6 itself, including the lug 4 and groove 5 configuration thereon and extending to about the bead 7 region of the tire, is comprised of natural rubber and cis 1,4-polybutadiene rubber with Tg's spaced apart by at least 30° C. together with the reinforcement of the aforesaid required large particle sized carbon black, precipitated silica and coupling agent together with starch in a form of starch/plasticizer composite.

Contrarily, the lug and groove configured circumferential tread 2 is of a diene-based rubber composition with an aforesaid smaller sized carbon back, exclusive of the relatively large sized carbon black and exclusive of the aforesaid precipitated silica, coupling agent and starch.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire with a carcass with circumferential rubber tread and associated sidewalls, wherein said tread and a portion of said sidewalls adjacent to said tread are of a lug and groove configuration designed to be ground-contacting, wherein said lug and groove configuration extends from said tread over at least thirty, alternatively at least fifty, percent of the tire sidewall adjacent to said tread, and alternately at least to a maximum section width of the tire, and wherein (A) said lug and groove configured portion of said sidewall is of a rubber composition which comprises, based on 100 parts by weight rubber (phr),
   (1) elastomers comprised of
      (a) about 40 to about 80 phr of cis 1,4-polyisoprene natural rubber having a Tg in a range of about −65° C. to about −75° C., and
      (b) about 20 to about 60 phr of cis 1,4-polybutadiene rubber having a Tg in a range of about 100° C. to about 106° C.,
   (2) about 40 to about 80 phr of reinforcing filler comprised of
      (a) about 5 to about 40 phr of carbon black having an Iodine value (ASTM D1510) of about 35 to about 85 g/kg and a dibutylphthalate (DBP) value (ASTM D2414) of about 70 to about 130 cm$^3$/100 g, wherein said carbon black is exclusive of carbon blacks having an Iodine value of 106 g/kg or greater,
      (b) about 10 to about 70 phr of aggregates of precipitated silica, wherein the weight ratio of silica to carbon black is in a range of about 0.3/1 to about 3/1, and
      (c) about one to about 12 phr of starch/plasticizer composite which contains hydroxyl groups thereon comprised of a composite of starch and a plasticizer for said starch to reduce its softening point by at least about 10° C. from a range of about 180° C. to about 220° C. to a range of about 110° C. to about 170° C., and
   (3) a coupling agent having a moiety reactive with hydroxyl (e.g. silanol groups) on the surface of said aggregates of precipitated silica and on the surface of said starch/plasticizer composite and another moiety interactive with said elastomer(s), and (B) said tread rubber of said circumferential tread, other than said rubber composition of said lug and groove configured sidewall, is comprised of, based on parts per 100 parts of rubber:
   (1) at least one diene-based elastomer selected from polymers of isoprene and/or 1,3-butadiene and copolymers of styrene with isoprene and/or 1,3-butadiene,
   (2) about 30 to about 95 phr of carbon black having an Iodine value in a range of about 100 to about 145 g/kg and a DPB value in a range of about 100 to about 145 cm$^3$/100 g, wherein said tread rubber composition is exclusive of precipitated silica, starch/plasticizer composite and coupling agent for said silica and starch/plasticizer composite and is exclusive of carbon black having an Iodine value in a range of from 35 to 85 g/kg together with a DBP value in a range of 70 to 130 cm$^3$/100 kg.

2. The tire of claim 1 wherein, for said starch/plasticizer composite, the starch to plasticizer weight ratio is in a range of about 0.5/1 to about 4/1, so long as as the starch/plasticizer composite has the required softening point range of from about 110° C. to about 170° C.

3. The tire of claim 1 wherein said lug and groove configuration extends from said tread to over at least fifty percent of the tire sidewall adjacent to said tread.

4. The tire of claim 2 wherein said lug and groove configuration extends from said tread to over at least fifty percent of the tire sidewall adjacent to said tread.

5. The tire of claim 1 wherein said lug and groove configuration extends from said tread over the tire sidewall adjacent to said tread to at least the maximum section width of the tire.

6. The tire of claim 1 wherein said sidewall rubber composition is exclusive of elastomers having a Tg in a range of about −70° C. and −100° C.

7. The tire of claim 2 wherein said sidewall rubber composition is exclusive of elastomers having a Tg in a range of about −70° C. and −100° C.

8. The tire of claim 1 wherein the carbon black reinforcing filler for said configured sidewall rubber composition is exclusive of carbon blacks having an Iodine value of 105 g/kg or greater.

9. The tire of claim 2 wherein the carbon black reinforcing filler for said configured sidewall rubber composition is exclusive of carbon blacks having an Iodine value of 105 g/kg or greater.

10. The tire of claim 6 wherein the carbon black reinforcing filler for said configured sidewall rubber composition is exclusive of carbon blacks having an Iodine value of 105 g/kg or greater.

11. The tire of claim 7 wherein the carbon black reinforcing filler for said configured sidewall rubber composition is exclusive of carbon blacks having an Iodine value of 105 g/kg or greater.

12. The tire of claim 1 wherein said configured sidewall rubber composition is exclusive of trans 1,4-polybutadiene, 3,4-polyisoprene, and high vinyl polybutadiene elastomer having a vinyl content of greater than fifty percent.

13. The tire of claim 2 wherein said configured sidewall rubber composition is exclusive of trans 1,4-polybutadiene, 3,4-polyisoprene, and high vinyl polybutadiene elastomer having a vinyl content of greater than fifty percent.

14. The tire of claim 7 wherein said configured sidewall rubber composition is exclusive of trans 1,4-polybutadiene, 3,4-polyisoprene, and high vinyl polybutadiene elastomer having a vinyl content of greater than fifty percent.

15. The tire of claim 1 wherein said sidewall rubber composition contains about 5 to about 15 phr of at least one additional elastomers selected from at least one of isoprene/butadiene copolymer rubber, synthetic cis 1,4-polyisoprene rubber and emulsion polymerization prepared styrene/butadiene copolymer rubber.

16. The tire of claim 2 wherein said sidewall rubber composition contains about 5 to about 15 phr of at least one additional elastomers selected from at least one of isoprene/butadiene copolymer rubber, synthetic cis 1,4-polyisoprene rubber and emulsion polymerization prepared styrene/butadiene copolymer rubber.

17. The tire of claim 7 wherein said sidewall rubber composition contains about 5 to about 15 phr of at least one additional elastomers selected from at least one of isoprene/butadiene copolymer rubber, synthetic cis 1,4-polyisoprene rubber and emulsion polymerization prepared styrene/butadiene copolymer rubber.

18. The tire of claim 1 wherein, for said configured sidewall composition, said coupling agent is a bis-(3-trialkoxysilylalkyl) polysulfide which contains from 2 to 8, with an average of from 2 to 2.6 or from 3.5 to 4 connecting sulfur atoms in its polysulfidic bridge.

19. The tire of claim 2 wherein, for said configured sidewall composition, said coupling agent is a bis-(3-trialkoxysilylalkyl) polysulfide which contains from 2 to 8, with an average of from 2 to 2.6 or from 3.5 to 4 connecting sulfur atoms in its polysulfidic bridge.

20. The tire of claim 19 wherein said coupling agent is a bis-(3-triethoxysilylpropyl) polysulfide.

* * * * *